United States Patent [19]

Laine

[11] 4,115,846
[45] Sep. 19, 1978

[54] REMINDER SYSTEM

[76] Inventor: Buddy Laine, 10454 Cumberland Dr., Sun City, Ariz. 85051

[21] Appl. No.: 770,437

[22] Filed: Feb. 22, 1977

[51] Int. Cl.$^2$ .......................... G06F 3/02; G06F 3/14
[52] U.S. Cl. .................................................. 364/200
[58] Field of Search .............................. 340/151, 152; 364/200 MS File, 900 MS File

[56] References Cited

U.S. PATENT DOCUMENTS

| | | | |
|---|---|---|---|
| 3,760,171 | 9/1973 | Wang et al. | 364/200 |
| 3,760,375 | 9/1973 | Irwin et al. | 364/200 |
| 3,833,888 | 9/1974 | Stafford et al. | 364/200 |
| 3,973,244 | 8/1976 | Lovercheck et al. | 364/200 |

Primary Examiner—Harvey E. Springborn
Attorney, Agent, or Firm—LaValle D. Ptak

[57] ABSTRACT

A reminder system which is particularly suited for use as a program reminder for television viewing includes an alphanumeric data entry keyboard for the entry of variable data and a function keyboard for controlling the entry of some fixed data and operation of the reminder system through a programmable microprocessor. The program is stored in a read-only memory (ROM), and the variable data is stored in a random access memory (RAM) from which it may be withdrawn as desired for display by a printer, or displayed on a LED display panel. The program includes a display of prompting information to guide the user in the proper entry of the variable data such as name of program, date, time and channel. Once the information is stored in the random access memory, it is displayed in response to operation of particular function keys to effect the desired display. A continuously operating system clock provides a display of the actual time and controls the operation of the timing of the reminder system itself.

5 Claims, 8 Drawing Figures

REMINDER SYSTEM

BACKGROUND OF THE INVENTION

At the present time, the average person spends many hours of each week watching various programs on a television receiver. In metropolitan areas, there usually are several television stations which are simultaneously broadcasting different program material. A person who desires to watch particular programs on various channels at different times on different days must have some type of guide or reminder to assist him in tuning the set to the correct channel at the correct time. The most common form of guide in present use is a booklet, either furnished with a local newspaper or printed specifically for the purpose of showing weekly program listings for a given area. These printed program listings, however, obviously carry all of the program material for the time period covered by the publication; and for any given viewer most of this material is unwanted and irrelevant. In making an initial selection of the desired programs, such program guides are necessary; but once a determination has been made as to what programs a person wishes to view on any particular day or evening, the guide is no longer necessary.

After reviewing the listings from a television program guide, most persons cannot remember all of the programs on the different channels he wishes to watch on successive days. Thus, it is necessary either to refer to the guide every day or to make a separate list of the program material which is desired to be viewed. Some program guides have been used in the past which are associated directly with the television set or radio receiver. These have included clock-driven belt logs having preprinted time intervals on them and particular entries for the program material available in the area with which the television or radio receiver is used. Such devices permit the viewer to check the time against the display on the log and then take whatever action is deemed appropriate following such a check. Some program indicators of this clock-driven type have included a provision for writing in variable program information. In most cases, however, the display of program material is limited to a rather restricted time interval, generally closely associated with the actual time of day. As a consequence, if a person is interested in determining what program material he wishes to view on subsequent days or at times other than the particular time span immediately viewable on the display, he cannot make such a determination from the display itself.

It is desirable to provide a television program reminder which is easy to operate to enter the variable television program information needed to identify particular television programs, the day and time on which they appear, and the channel on which such programs are presented. Ideally such a reminder system should include a provision for permitting display of the program information for a number of days ahead of a particular day at the option of the user. Also, it is desirable to have such a display in an easily readable form, either as a presentation on a display panel or as printed copy. Finally, such a reminder system should be one which may be used directly in conjunction with the television receiver so that its location is convenient to the television receiver itself.

SUMMARY OF THE INVENTION

Accordingly, it is an object of this invention to provide an improved reminder system.

It is another object of this invention to provide an improved reminder system for entering, storing and displaying formatted messages having at least some variable content.

It is an additional object of this invention to provide an improved reminder system for storing and displaying fixed format messages on demand.

It is a further object of this invention to provide an improved reminder system particularly suited for use as a television program reminder.

It is yet another object of this invention to provide an improved microprocessor controlled reminder system.

In accordance with a preferred embodiment of this invention, a reminder system for entering, storing and displaying formatted messages includes a display device for displaying the messages. A memory storage stores at least some fixed portions of the formatted messages, and a keyboard is included for entering variable data into the system. A control device, such as a microprocessor, interconnects the storage device and the variable data entry keyboard with the display devices; and effects display of fixed portions of the messages along with the variable data associated with those fixed portions under control of an operating circuit connected to the control device.

DETAILED DESCRIPTION

Referring now to the drawings, the same reference numbers are used throughout the several figures to designate the same or similar components.

Figures 1, 2:
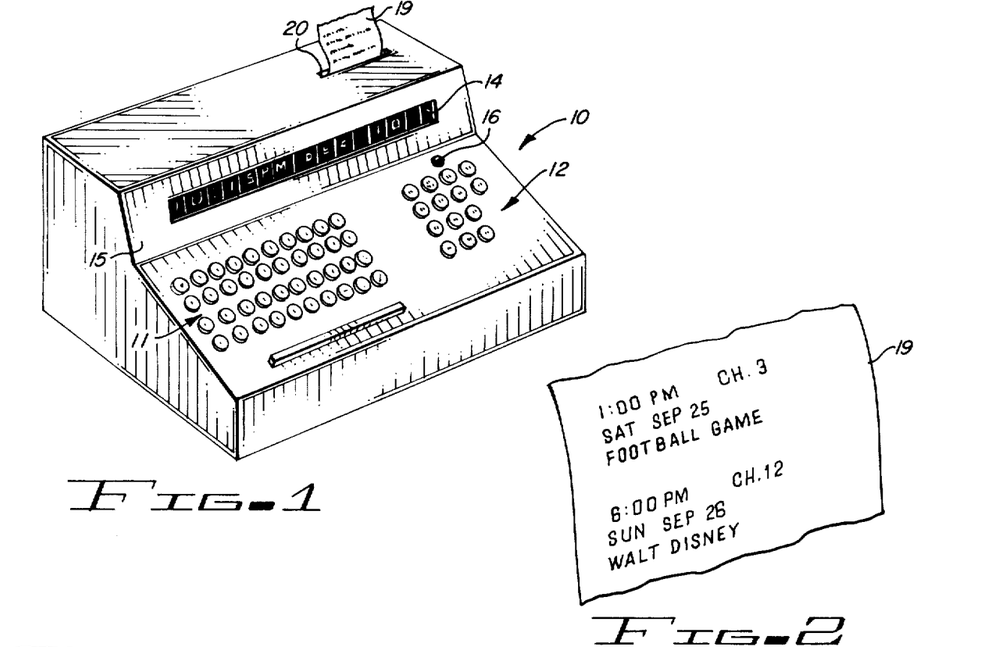
FIG. 1 is a perspective view of the cabinet of a reminder system constructed in accordance with a preferred embodiment of the invention.
FIG. 2 illustrates a portion of a typical printed record produced by the system shown in FIG. 1.
Figure 3:
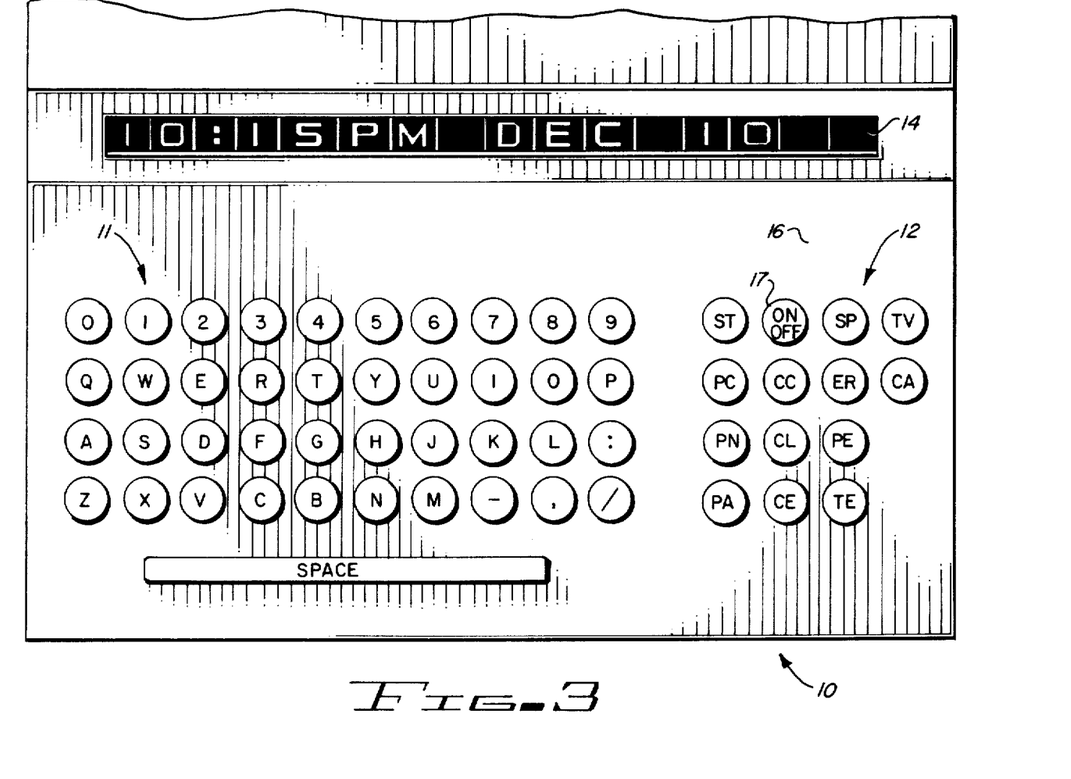
FIG. 3 is a detailed illustration of the keyboard and display panel portion of the cabinet shown in FIG. 1.

The reminder system, when it is used as a television program reminder, is housed in a cabinet 10 which has a front portion sloped slightly upwardly and which contains two keyboards 11 and 12. The keyboard 11 is a conventional alphanumeric keyboard; so that the user may type variable entries into the reminder system. The keyboard 12 contains program function keys which are used to direct the system when entering, displaying or editing entries. The keyboard 12 also includes an on-off switch 15 (FIG. 3) used to turn the system on and off;

and the operating condition of the system is indicated by a lamp 16 located above the key 15 on the front panel of the keyboard.

A 16 character alphanumeric display 14 is provided just above the keyboard on a nearly vertical face 15 of the cabinet. Preferably, the display 14 is an LED display of the type in widespread use on calculators and the like. One function which the display 14 performs is a continuous display of the time and date, unless other information is being entered or being read from the system, at which time one of the function control keys of the keyboard 12 is used to override the time/date information on the display and substitute other information. In times of non-use of the system for performing the entry or readout of data from the reminder system, however, the display 14 continuously displays the current time. Displays of this type are commonly employed to show the time of day on microwave ovens and other appliances, and the display 14 operates in the same manner as these conventional displays.

In addition to providing a sixteen character display of the time and date or other information, the reminder system supplies printed fixed format messages of reminder data entered into and stored in the system. These messages are printed out on paper or other suitable material 19 which exits from a slot 20 in the top of the cabinet 10. The printed record preferably is made on a continuous roll of paper of the type employed in adding machines, printing calculators or the like; and a representative segment showing two typical fixed format messages is illustrated in FIG. 2.

Figure 4:
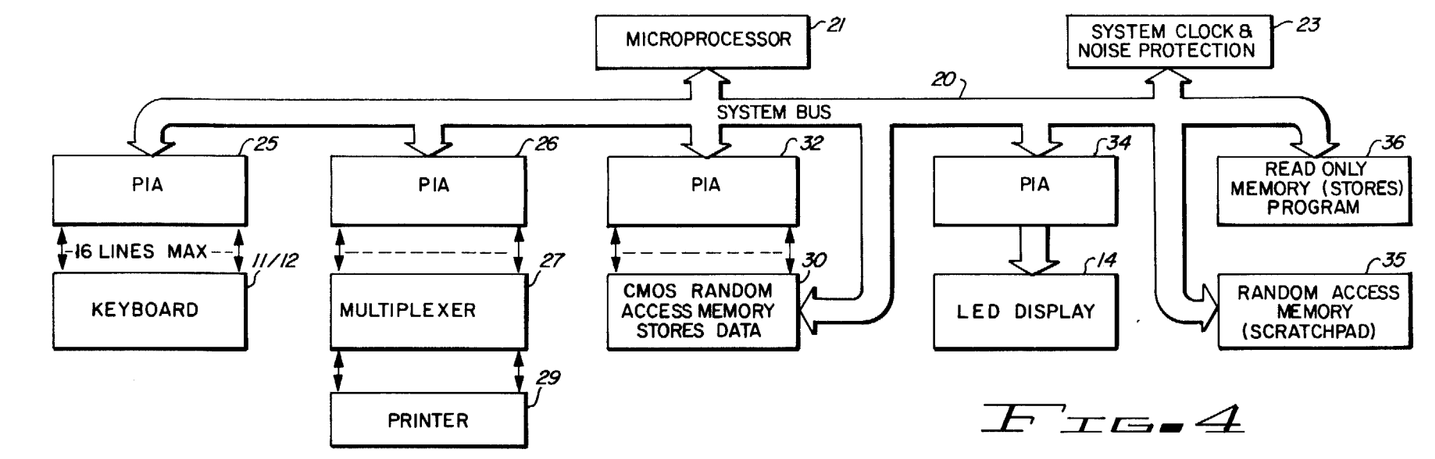
FIG. 4 is a block diagram of the reminder system housed within the cabinet of FIG. 1 and controlled by the keyboard shown in FIG. 3.

A block diagram of the system operated under control of the keyboards 11 and 12 is shown in FIG. 4. All of the major parts of this system interconnect by way of a system bus 20 which contains address data and control lines required for operation of the system. The functional operation of the reminder system is controlled by a microprocessor 21 of conventional type currently available. For example, a Motorola M6800 microprocessor could be employed; but other types of microprocessors can be used as well as this particular one. The M6800 microprocessor is a bus-organized system which permits system expansion without the need for additional bus extension circuits since additional features or memory extensions can be added to the system using the same bus 20 which is used in the basic circuit shown in FIG. 4.

A system clock and noise protection circuit 23 is employed to provide the clock signals necessary for the system operation of the microprocessor and the associated system and memory circuits. The system clock 23 also operates a time of day and date clock circuit for application to the LED display 14. Circuitry for accomplishing these functions is in widespread use in similar applications, so that details of the time of day and date generating circuits have not been shown to avoid unnecessary cluttering of the drawing. Various standard circuits may be employed.

If desired, the system clock and noise protection circuitry 23 also may be used to sense situations which exist in the event that the system is not operating properly to cause a restart command to be applied to the system for returning it to a normal operating condition. This feature could be eliminated, but it is desirable since transients from sources such as lightning may cause a computer system to enter an improper instruction sequence and then function improperly. Various other types of standard protection circuits may be included in the system but are not necessary to its fundamental operation.

The keyboards 11 and 12 are interfaced with the system bus 20 by a peripheral interface adapter (PIA) 25. Another peripheral interface adapter 26 interfaces with the system bus through a multiplexer 27 with a printer 29 which is used to print the formatted messages on the paper roll 19 shown in FIGS. 1 and 2. The peripheral interface adapters 25 and 26 are conventional, universal, interface devices; and for interfacing with the microprocessor described previously, preferably are Motorola M6800 series part numbers. The multiplexer 27 is used to create an interface between parallel and serial signals passing between the PIA 26 and the printer 29. Again, standard multiplexer techniques may be used in the multiplexer 27 to handle the signals in a proper format for the particular type of printer which is selected for the printer 29, that is, whether the printer is a character-at-a-time or line-at-a-time printer.

A main random access memory (RAM) 30 is used to store the fixed format messages which constitute the program information to be displayed by the system in the display 14 or supplied to the printer 29 for reproduction on the paper roll 19. This memory 30 is interfaced with the system bus by another PIA circuit 32 which is the same type of universal interface circuit as the PIA circuits 25 and 26. Normally the memory 30 is connected directly to the system bus 20; but in order to protect the memory 30 against an illegal write command which could be caused by a strong noise pulse such as caused by lightning, a specific word (generally referred to as a "key") is stored in the PIA 32. This "key" word is used to enable (unlock) access to the memory 30. This feature could be eliminated but serves in conjunction with the noise protection circuitry in the circuit 23 to protect the integrity of the system operation and prevent the loss or erroneous entry of data into the memory 30 and therefore into the system.

In order to provide the maximum flexibility to the system and to store only valid data in the main memory 30, a second random access memory (RAM) 35 is used as a "scratch pad." This memory is connected directly to the system bus 20 and, for the type of fixed format messages under consideration here (that is television program listings), it may be of relatively low capacity, for example 128 to 256 bytes.

The typical memory which may be used for the memory 35 is the Motorola M6810 memory which is compatible with the microprocessor 21 and PIA circuits 25, 26 and 32.

One other memory sub-system is used in the reminder system, and this is a read-only memory (ROM) 36 which is used to store the program for the system and, with the system under discussion here, requires from 2,000 to 3,000 bytes of storage capacity. The memory 36 could be an electrically erasable read-only memory, but once the system program has been finally established for a given system, a masked programmed ROM memory is preferable.

When the LED display 14 is used in the system, it is interfaced with the bus 20 through a PIA circuit 34, which is of the same type as the circuits 25, 26 and 32.

The system which is shown in FIG. 4 and which has been generally described above employs a standard family of readily available parts throughout and, because the microprocessor 21 is used, provides a maximum flexibility for further expansion of the reminder system function without requiring a re-design of the system itself.

Figure 5:
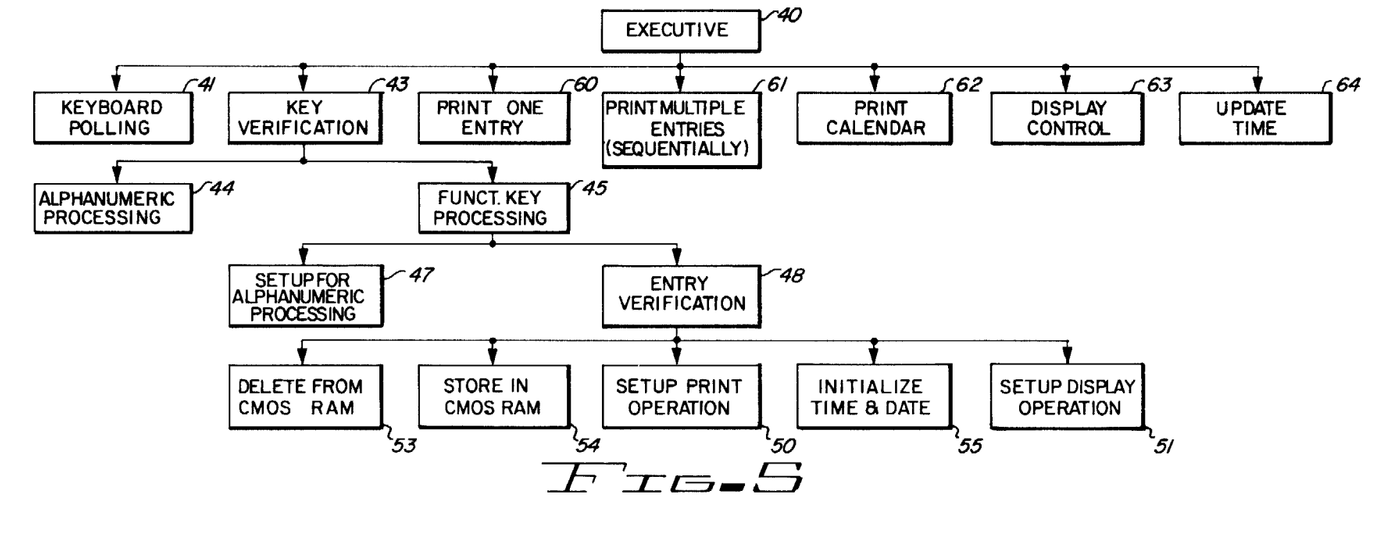
FIG. 5 is a software block diagram of the software used to operate the circuit of FIG. 4.

Reference now should be made to FIG. 5 which is a block diagram of the software programs which are used to operate the system. This program block diagram shows all of the functional software modules which are needed for system operation of the system described above. Not shown in the software block diagram of FIG. 5 are sub-routine packages containing programs such as the logical or mathematical operations which are used by all of the functional modules, the interrupt structure, watchdog timer control, power up, initialization, or error recovery. Such sub-routine software is known to those skilled in the microprocessor art and is fundamental to any microprocessor system configuration, yet does not have any direct bearing on the functional operation of the particular software used to operate the system.

Shown at the top of FIG. 5 is the executive program 40. This program controls the order of execution of all of the functional software modules shown on the horizontal line immediately below the executive program. Service requests are set up by the conventional interrupt structure or by the modules themselves, and the executive program 40 determines the order in which they are granted service. For example, at any given point in time the executive 40 may have service requests to poll the keyboard, print one entry and update time on the clock. Based on a predetermined list of priorities which are part of the executive program 40, the keyboard would be polled first, one entry would be printed, then the time would be updated. With this type of structure for the executive program 40, it is easy to add additional software modules (functions) to the system at subsequent times. For example, if a printer 29 were not included in the system initially, adding the print capability and removing the display 14 or adding the print capability in addition to the display 14 requires only a minor programming change in the executive program 40.

A keyboard polling module 41 is used to poll the keyboards 11 and 12 on a periodic basis, checking for key depressions. A key must be depressed for some minimum time interval (typically 30 milliseconds) to eliminate mechanical bounce before it is considered a valid entry. In addition, if two or more keys are simultaneously depressed, neither key can be accepted since the system would have no way of knowing which key, if either, was the desired one. Once a key from either keyboard 11 or 12 is accepted as valid, an executive request for key verification from the key verification module 43 is made. The key verification module 43 functions to determine if the current key depression is valid. If it is valid, the module 43 then causes the system to perform the appropriate action which is to be accomplished by the depression of that particular key from either one of the keyboards 11 and 12.

The first stage of processing of the key verification module 43 is to eliminate obvious errors such as an alpha-numeric entry prior to the entry of data from a functional key or a functional key entry before a specific entry in response to some other key is completed. After this processing is completed by the program module 43, the alphanumeric keys are processed in an alphanumeric processing program module 44, which in turn causes the storage of the key depression in the system memory. Functional key processing, accomplished by a functional key processing program module 45, consists of two parts. The first of these is to initialize the system to accept alphanumeric key entry from the keyboard 11 and the second is to verify that all the required information has been entered and the system can proceed to the next step. The start (ST) and enter (ER) keys on the functional keyboard 12 (FIG. 3) are examples of these operations.

Once the key entry has been verified, any of the operations of the program modules of the bottom line of FIG. 5 can be performed. The particular program module which is performed depends upon the entry key verification performed in the program module 48 by the system. Examples of entry verification are correct data. For example, Monday, Dec. 25, 1976 is incorrect while Saturday, Dec. 25, 1976 is permitted by the system. Channel 0 for a television station is incorrect, etc. If an incorrect entry is located as determined by the processing step and the information stored in the system memories, the system user is prompted to re-enter the data in an attempt to obtain correct data from him.

Once a correct entry has been completed, one of the program modules on the bottom line of FIG. 5 then is used to complete the operation. Two of the modules, the "Set Up Print" module 50 or the set up display operation module 51 may be included in the software even if a printer 29 or a display 14 is not used. In the system being described, both of these are present; so these modules are effective to effect the respective print or display operation in accordance with the program. The function of these modules is to determine which data is to be printed or displayed, place that data in the random access memories 35 and 30, and then set the appropriate executive service request of the executive module 40.

The other three program modules shown on the bottom line of FIG. 5 also are operated in response to the entry verification program module 48 and include a module 53 for deleting information from the RAM memories, a module 54 for storing information in the RAM memories, and a module 55 for initializing the time and date information for display.

Once this is done, the system is set back at the appropriate executive service request from the executive module 40 to place the program in one of three separate printer module modes, a display mode, or update time mode. The three printer modules are a print single entry module 60, a print multiple sequential entries module 61 and a print calendar module 62. In addition, there is a display control module 63 and the update time module 64. The three separate printer modules 60, 61 and 62, which are shown, use a common printer drive sub-routine since the data which is controlled by these modules all is ultimately obtained from the same single printer. The update time module 64 simply updates the clock for display on the LED display 14, while the display control 63 determines what information is displayed, that is the clock/date information or other information.

As stated previously, the operation of the system in conjunction with the program shown in FIG. 5 is effected by data entry on the keyboards 11 and 12. The primary program control is effected by the function keyboard 12, and reference now should be made to FIG. 3 which shows this keyboard in detail. Each of the keys of the keyboard 12 are identified with a particular mnemonic indicia. Listed below are the functional descriptions of the operation which is effected by use of these various keys on the keyboard 12:

| KEY | OPERATION |
| --- | --- |
| On/Off | This key turns the system on and when it is pushed a second time, turns the system off. It does not turn on and off the memory circuits and the circuitry utilized in conjunction with the display 14 and the clock to continuously provide an updated time and date information to the display 14. The key does however turn on and off the printer mechanism and those portions of the system which are not used to maintain the storage of information in the system memories. |
| "ST"-START | This key prepares the system to accept alphanumeric information from the keyboard 11 regarding the program name and other variable data. The key also initiates prompting from the system program. |
| "SP"-STEP PAPER | This key automatically steps the paper forward one line each time the key is depressed. This is useful when the system user wishes to tear off and save any printed data on the paper 19 which is exiting from the slot 20. |
| "TV"-TELEVISION | This key is used whenever the system is also used as a general purpose reminder system and is required to distinquish between television reminders and other events such as meetings, birthdays, anniversaries and so forth. The TV key is necessary in the event the television receiver is to be turned on automatically or a video tape unit is to be turned on by the system at the time indicated by the entry. |
| "PC"-PRINT CURRENT ENTRY | This key commands the system to print the current entry. Normally this is used just prior to a CLEAR ENTRY (CE) command. |
| "CC"-CLEAR CURRENT CHARACTER | If a character-at-a-time impact printer is used in the system, this key causes deletion of the last character entered by the user and initiates reprinting of the line. |
| "ER"-ENTER | Depression of this function key is used when the system user has completed a line of data which is to be entered into memory and causes the system to prepare for the next step in its program. |
| "CA"-CALENDAR | If desired, the memory 30 can be programmed to store monthly or yearly calendars for reproduction on demand. This is an optional key but is depressed if this feature is included in the system and the printout of a calendar is desired. |
| "PN"-PRINT NEXT ENTRY print the next entry that is stored in | This function key commands the system to the memory and allows the user to print sequential program entries. |
| "CL"-CLEAR CURRENT LINE | Operation of this function key causes deletion of the current line being entered into the scratch pad memory 35 and initiates re-printing of the prompter message for that line. |
| "PE"-PRINT EVENT | This key is used in conjunction with the ER key to effect printing or display of the events for the current day. |
| "PA"-PRINT ALL ENTRIES print all of the program entries that | This function key commands the system to are stored in the system memory 30. |
| "CE"-CLEAR CURRENT ENTRY ENTRY from the system memory 30 the program | Depression of this key is used to delete information that was printed due to a PC or PN command. The CE key must be depressed within 5 seconds after the printing stops or it is ineffective. This is done to prevent accidental removal of an entry after a PC or PN command. |
| "TE"-TIME ENTER | Depression of this key followed by keyboarding from the keyboard 11 for the appropriate time is used to enter the time of day when the system is initially put into operation or to correct the time of day at any subsequent time. |

While the foregoing list provides a description of the system operating events which occur in response to the operation of the various functional keys, it is believed helpful to present some examples of the system operation in order to understand how the software program of FIG. 5 may be used to control the operation of the system of FIG. 4. For optimum utility of the system, it is desirable for the program to cause the reminder system to prompt the user prior to the entry of the variable data from the keyboard 11 into the system. A typical example illustrating the entry of a television program listing will now be given.

The first step in either entering data into the system or effecting a printout or display of the stored data is to depress the On-Off function pushbutton 15 to turn the system on. As stated previously, this is indicated by turning on the lamp 16. Once this has been done, the system then is ready to accept the entry of new data or printout or reproduce data already stored.

Assume that the entry of a new TV program listing is desired. To effect this, the user depresses the ST (Start) key. The program then causes the printer or the display 14 or both to print or display the words "Program Name." This is the prompting for the user to tell him that the next data to be entered into the system is the name of the program. This data then is entered from the keyboard 11 and the printer prints the information as it is entered. As stated previously, this information also may be displayed on the display 14. For example, assume that the information is entered "Football Game". When the user has satisfied himself that the entry is correct, he depresses the ER function key. This causes the entry of the program name in the scratch pad memory 35.

At the same time, the system automatically steps to the next programmed step and causes the prompting information "Day-Month-Date" to be displayed to the user. This means that the next information which the user is to enter is the day, month and date information. The user then types this information on the keyboard 11, for example: "SUN-SEPT-26". When this has been done, the ER key is depressed again. This information then is entered in the memory 35 and the system automatically steps to the next step in the program to cause the prompting information "Time-CH" to be displayed to the user. This tells him that he must type in the program time and the channel number, for example, "6 PM-12". After he has done this, and is satisfied with the entry, the ER key is depressed again. For a television program listing, this is the last of the three portions of information which are to be entered and the program sequence is completed. This information upon the depression of the ER key for the third time then effects the transfer of the entered data from the scratch pad memory 35 to the main random access memory 30 where it is stored.

From the foregoing, it can be seen that the user starts the procedure by pressing the start "ST" key. The system then continues to prompt the user prior to each line of entry and following the entry of such appropriate alphanumeric information, the user enters each line of information by depressing the enter "ER" key. This is all that is required to enter reminder information into the system.

Now if the user wants to have a printout of the current entry, that is the one he has just made, he depresses the PC (print current entry) key. This then causes the printer to print out that entry in the format shown most clearly in FIG. 2. For example, if the upper one of the two entries shown in FIG. 2 was the current one just entered, this is the entry which would be printed. If the user decides that he wants to clear this entry from the system memory, he next pushes the CE (clear current entry) key. This then causes the entry to be removed from the memory 30.

Assume that the user is in the process of entering a television listing in the manner described above but that in making the day, month and date entry, an error is made, for example "SUN-SEP5". Thus, the month is incorrectly entered and an ambiguity may result. If the user catches this error immediately after it has been made, the next step is to operate the "CC" key. This results in the system repeating the prompt (day-month-date) and the line entered by the user is reprinted except for the last character which was entered. This was the erroneous character. This command is used when the printer is one which is capable of printing one character at a time. If a line-at-a-time type of printer is used in the system for the printer 29, the user would use the "CL" key instead. This would cause the system to repeat the prompt, but no additional material would be entered. The user then would need to retype or re-enter the entire line of data.

If the user of this system, even when a character at a time printer 29 is being used, recognizes the error after entering several characters, it is more convenient to use the "CL" key and simply start over. As stated previously, this causes the system to remove the entire line previously entered but the prompt which immediately preceded that line is repeated by the system program.

From the foregoing, it is apparent that the system is easily operated to enter new reminder data into it. The chance for error is substantially reduced by the use of the program which effects the printing or display of a "prompt" prior to the entry of the desired information. The total number of entries which the system can accommodate obviously is limited by the capacity of the random access memory 30.

The print command function keys, when operated, effect the printout of whichever entry is associated with the command in accordance with the designations given above in the description of the function keys themselves. The use of the "PE" (print events) function key is provided when the system is programmed with a capability of printing events for a current day or several consecutive days. If the "PE" key and then the "ER" key are sequentially depressed, the events for the current day, as established by the update time program module 64, are printed. To obtain a list of events for several days, the user may depress the "PE" function key followed by the number of days entered on the alphanumeric keyboard 11 and then operate the "ER" key. The system then is programmed to print the entries for the number of days entered in the proper sequence. These same features can be accomplished by use of the display 14, if desired.

Figures 6, 7:
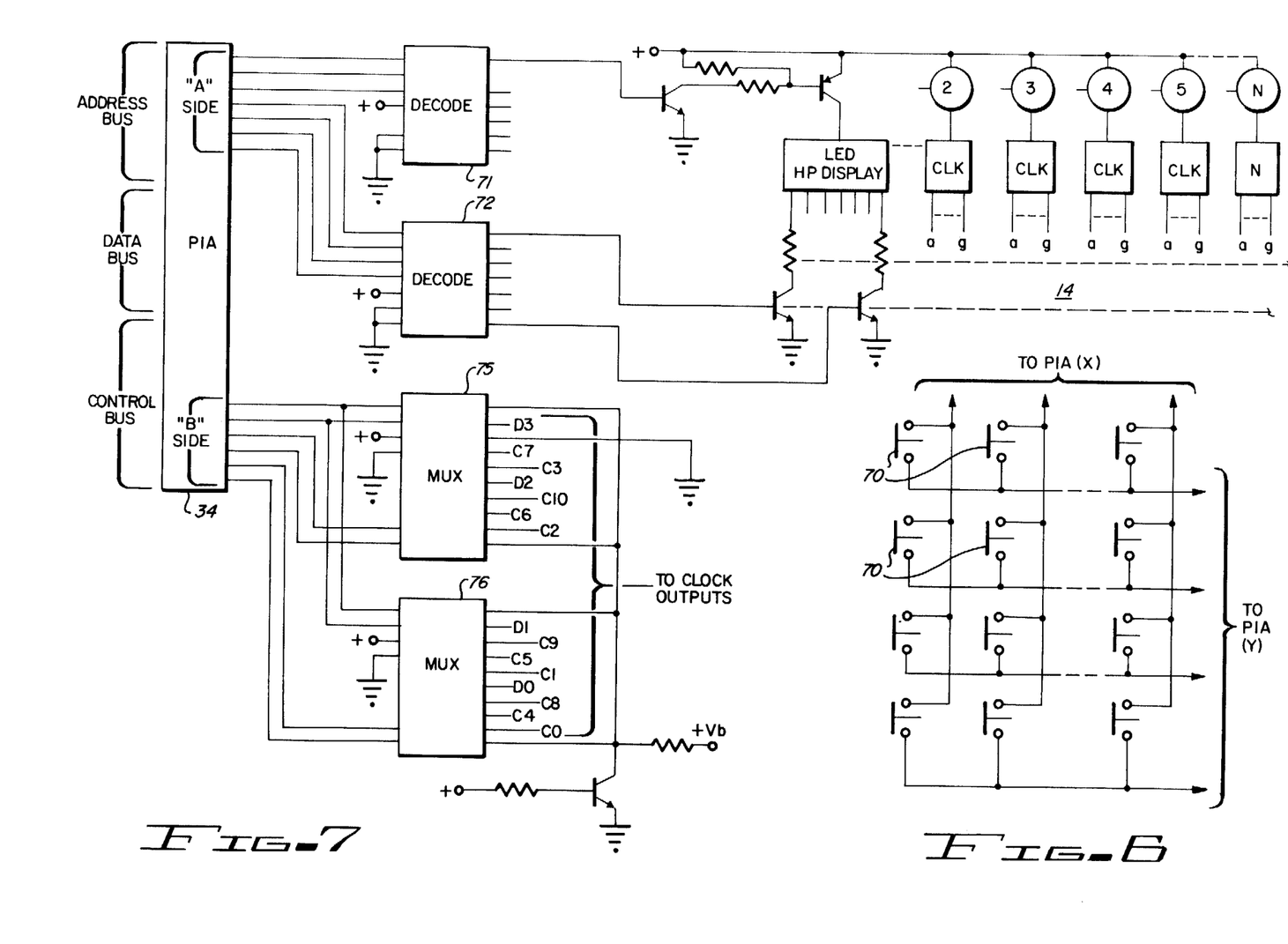
FIG. 6 shows the keyboard matrix used to interface between the keys of the keyboard shown in FIG. 3 and the circuitry of FIG. 4.
FIG. 7 is a more detailed circuit diagram of the peripheral interface adapter circuit interconnections with the clock and display portions of the circuitry of FIG. 4.
Figure 8:
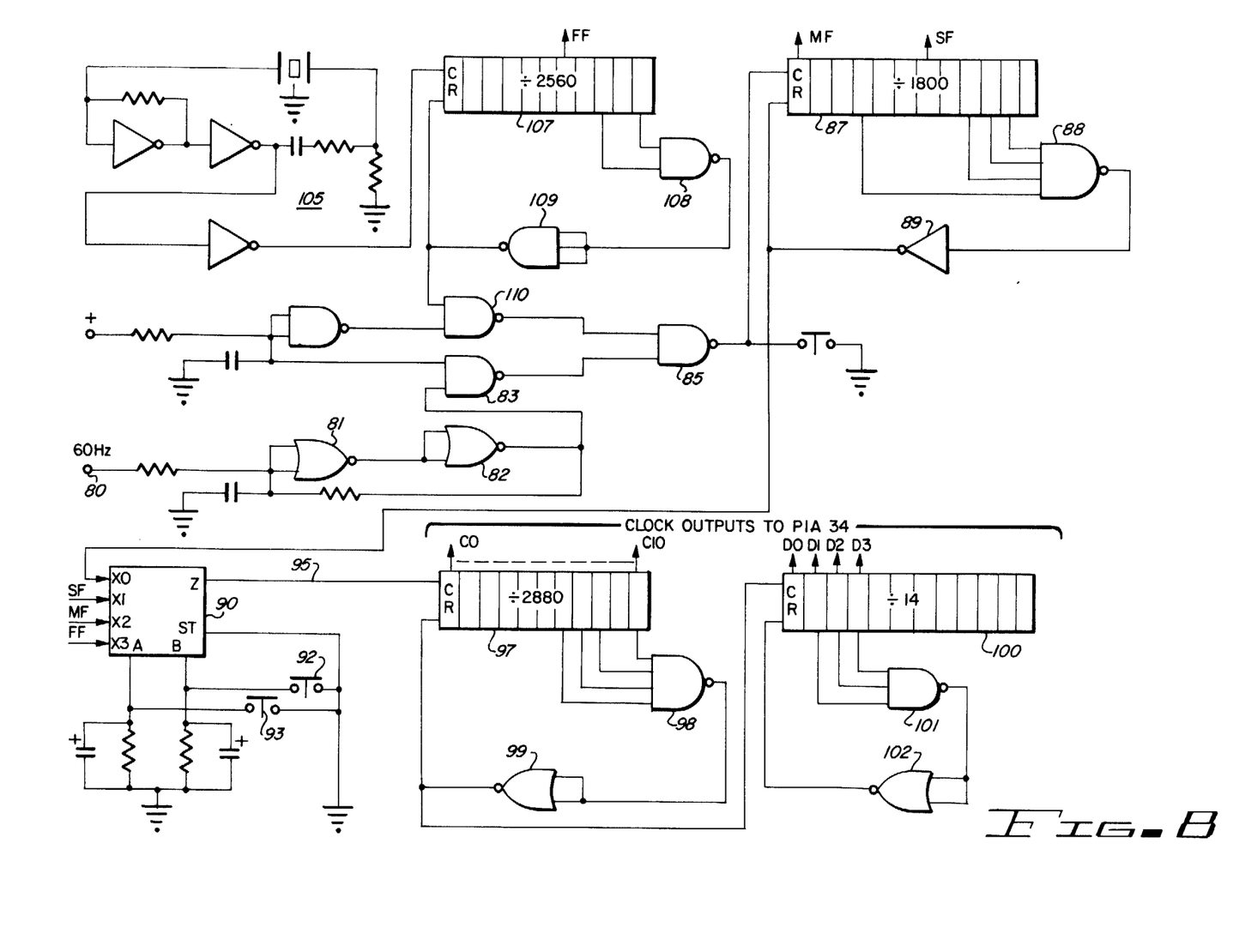
FIG. 8 is a detailed block diagram of the clock circuitry used for controlling the operation of the circuit of FIG. 4.

Reference now should be made to FIGS. 6, 7 and 8 which show in greater detail a portion of the system of FIG. 4. FIG. 6 is a typical illustration of a portion of the keyboards 11 and 12 to indicate the manner in which the closure of a key switch provides unique X and Y information to the PIA circuit 25. Such a matrix is commonly employed with keyboards used in data communications and computer applications. This circuitry comprises a plurality of individual key switches 70 which are used to interconnect unique cross points in the X and Y matrix to the PIA circuit 25.

Reference now should be made to FIG. 7 which illustrates the typical interface between the PIA circuits and the particular circuits with which such circuits are associated. In FIG. 7, the PIA interface with the clock and LED display is illustrated. The PIA circuit 34 interfaces with the system bus 20 which includes portions dedicated to address bus, data bus and control bus as indicated in FIG. 7. The output side of the PIA circuit then interfaces with a pair of decoding circuits 71 and 72 for driving and operating the LED display sections of the sixteen character display 14. The decode circuit 71 typically may be a BCD to decimal decoder such as the Motorola MC 14028 and is used to provide operating potential to the particular display segments which are to be activated at any given time. One connection for energizing the first character of the LED display is shown connected to the circuit 71. The other connections are comparable, and to avoid unnecessary cluttering of the drawing have not been shown in detail. The particular segments of the selected display which then are to be energized are determined by the decoding circuit 72 which typically may be a Motorola MC14558 circuit. One of these circuits 72 is employed with each of the 16 LED displays or alternatively a multiplexing type of arrangement may be employed to cut down on the number of decode curcuits 72 which are necessary. The manner in which the signals are decoded to produce the desired display is conventional, and is effected by the signals on the system bus 20 under control of the program to energize the decoders 71 and 72 at the proper times.

Similarly, the PIA circuit 34 may be used to apply clock signals through a pair of multiplexer circuits (typically Motorola MC14539) circuits 75 and 76. The various clock outputs which are supplied from the circuits 75 and 76 then are used to operate the different portions of the system of FIG. 4 in conjunction with the program controlling the signals on the system bus 20 for effecting the various functions in the operation of the system as determined by the program supplied to the microprocessor 21.

Interfaces between the other PIA circuits 25, 26 and 32 and their respective system components are also accomplished in accordance with standard techniques. Thus, it is considered sufficient for purposes of illustration to show the PIA interface with the clock and LED display as a typical interface which may be used in the system.

The clock circuit for the system clock 23 may be one of a number of different forms; and the circuit of FIG. 8 is a typical form which may be used, although it is to be understood that other clock circuitry for producing clock pulses at the frequencies necessary to operate the system may be employed as well as the one shown in FIG. 8. The particular circuit details which are used are unimportant since the obtaining of various clock pulses at different times with respect to one another and at different frequencies is readily accomplished by those skilled in the art.

The circuit of FIG. 8 is constantly energized and is used to provide a "real time" either with or without alternating current line power applied to the system itself. Normally the unit is plugged in, and 60 hertz line frequency is applied to the input terminal 80 to provide the time base and day of cycle information through gating circuitry 81, 82, 83 and 85 to the counter circuits comprising the clock system. The outputs of the gate 85 are applied to a first counterdivider circuit 87 which is continuously recycled once it reaches a preestablished count as determined by an output gating circuit 88. The count which causes this recycling varies in accordance with the particular operating conditions of the system.

Each time an output pulse is obtained from the gate 88 and passed through an inverter 89, it is passed in turn to the XO input of a data selector/multiplexer circuit (such as a Motorola MC14539). This circuit, in accordance with an address selection effected by one or the other of a pair of pushbutton switches 92 and 93, provides periodic outputs on a lead 95 to the input of another binary counter 97 which is similar to the counter 87. The counter 97 is continuously recycled each time it attains a predetermined count by means of a gate 98 and inverter 99, and the output pulses from the inverter 99 serves as input pulses for another counter 100. The counter 100 also is similar to the counters 87 and 97 and is continuously recycled upon the attainment of preestablished counts by means of a gate 101 and inverter 102. The outputs of the counters 97 and 100 constitute inputs to the multiplexing circuits 75 and 76 of FIG. 7 for applying various clock pulses to the PIA circuit 34 for use in the system operation.

In the event there should be a power failure, thereby terminating the application of the 60 hertz signals to the terminal 80, a backup crystal oscillator circuit 105 is provided. This circuit is operated by a standby battery (not shown) which normally is continuously tricklecharged by the power applied to the terminal 80. Normally the circuit 105 is ineffective, since the signals from the terminal 80 predominate in controlling the gate 85. Upon a power failure however, the output of the oscillator 105, after it has been divided down in a binary counter-divider circuit 107, constitutes a series of 60 hertz pulses applied through an output gate 108 and an inverter 109 to the input of a control gate 110. This gate, in turn, supplies the desired 60 hertz pulses to the gate 85 for controlling the rest of the clock circuit as described previously. The clock, counters, crystal oscillator and the RAM memory 30 all run off of the same rechargeable battery during a power failure as do the LED display and real time clock/calendar circuitry. Thus, even in the event there is a power failure, the system does not lose time and the material stored in the memory 30 is not lost.

The foregoing description is to be considered illustrative only, and is not intended to be restrictive since various modifications will occur to those skilled in the art without departing from the scope of the invention.

I claim:

1. A program reminder system for entering, storing and displaying formated messages for subsequent reference including in combination:

display means for displaying messages having a predetermined format;

storage means for storing at least predetermined portions of said messages;

variable data entry means for entering variable data into the system, said variable data entry means including a data entry keyboard having a plurality of keys for entering data and a first random access memory for temporarily storing data entered by operation of at least some of said keys of said entry keyboard;

control means connecting said storage means and said variable data entry means with said display means; and programmable operating means having an operating program and coupled with said control means for operating said control means to effect display of said predetermined portions of said messages and said variable data on said display means in an array of message portions corresponding to the program of said operating means.

2. The combination according to claim 1 wherein said programmable operating means includes microprocessor means.

3. The combination according to claim 1 wherein said storage means comprises an ROM memory.

4. The combination according to claim 3 wherein said control means comprises a second random access memory and said programmable operating means comprises a microprocessor coupled with said storage means and said variable data entry means for effecting transfer of information from said storage means and said first random access memory into said second random access memory in response to operation of at least one predetermined key of said keyboard in accordance with said program.

5. The combination according to claim 4 further including program function keys in said entry keyboard and wherein said microprocessor initially effects the entry of variable data from said keyboard into said first random access memory in response to operation of some of said program function keys, and selectively transfers data from said first random access memory to said second random access memory and selectively transfers data from said second random access memory to said display means in response to operation of other program function keys.

* * * * *